UNITED STATES PATENT OFFICE.

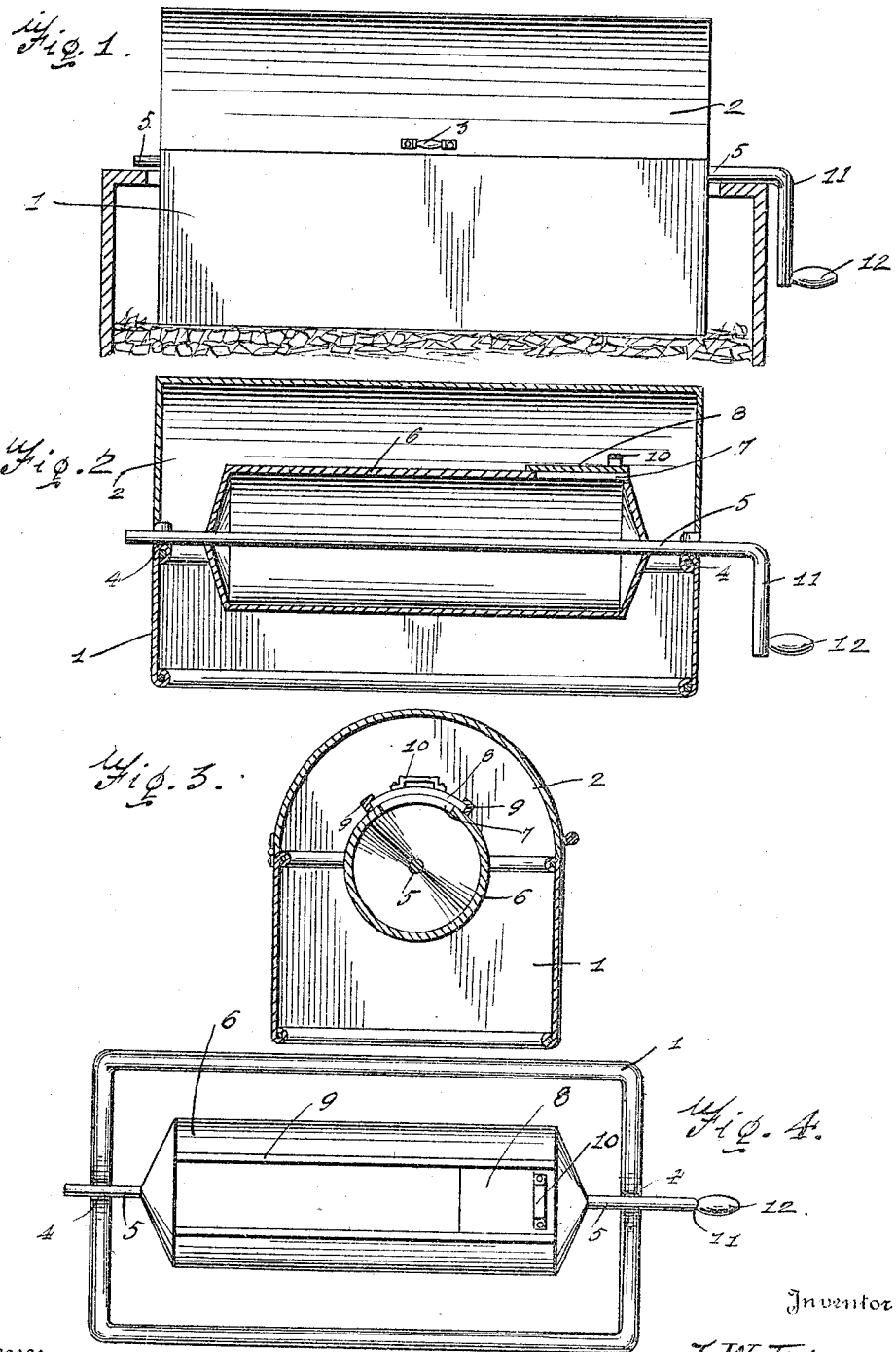

JOHN W. FISSE, OF LEONARDTOWN, MARYLAND.

COFFEE-ROASTING MACHINE.

1,231,723.  Specification of Letters Patent.  Patented July 3, 1917.

Application filed August 11, 1914. Serial No. 856,211.

*To all whom it may concern:*

Be it known that I, JOHN W. FISSE, a citizen of the United States, residing at Leonardtown, in the county of St. Marys, State of Maryland, have invented certain new and useful Improvements in Coffee-Roasting Machines; and I do hereby declare the following to be a full, clear, and exact description of the invention, such as will enable others skilled in the art to which it appertains to make and use the same.

This invention relates to a coffee roasting machine.

An object of the invention is to provide a machine of this character which may be readily placed upon the coals of a range after the lids and the center supporting means have been removed therefrom.

A further object of the invention is to so construct the device that the heat will be directed to the container drum.

A further object of the invention is to so construct the device that the parts thereof may be operated during the roasting of coffee or the like to expose the coffee in the container drum so that it may be determined whether or not the coffee is in condition to be removed.

With these and other objects in view, such as will appear as the description progresses, my invention comprises the combination and arrangement of parts as set forth in and falling within the scope of the appended claim.

Referring to the drawing:

Figure 1 is a side elevation of my device showing the same in place in a stove, the parts of the stove being shown in section.

Fig. 2 is a vertical longitudinal sectional view of my device.

Fig. 3 is a similar section taken at right angles to Fig. 2.

Fig. 4 is a view with the cover removed.

Referring to the drawing wherein like parts are indicated by like characters throughout the several views:

My device comprises a frame 1 which consists of a rectangular vertically disposed strip which is braced on its upper and lower edges by steel wire or the like. Hingedly connected to this wire on one of the long sides of the frame is a cover 2 which is semicylindrical in formation and which has a handle 3 on the edge opposite to the hinges.

In the opposite ends of the frame 1 the uppermost wire reinforcing member is bent downwardly to form bearings 4 and in these bearings a shaft 5 is revolubly mounted which extends longitudinally of the said frame 1 and between the sides of the same.

Rigidly secured to this shaft 5 is an elongated cylindrical drum 6 which has an opening 7 in its face, which opening is closed by a sliding door 8, the latter being operable in guides 9 and having a handle 10 thereon by means of which it may be engaged by the stove lid lifter or the like. The shaft 5 extends outwardly beyond one end of the frame 1 and has a crank 11 formed thereon on which is mounted an operating handle 12.

In operation the lids and center supporting means of a coal range are lifted from their places and the device is placed in on the coals so that the frame 1 rests directly upon said coals and the drum is above the same. The coffee or other beans to be roasted are placed in the drum 6 after the door 8 has been operated in its guides 9 and the said door is then closed. The cover 2 is then swung about its hinges and closes the frame 1 so that the drum is below the said cover 2. Thus it may be seen that the heat from the coals will rise between the sides of the frame 1 and circulate about the drum 6 beneath the cover 2 and by rotating the drum 6 through the crank arm 11 the beans within the drum will be constantly agitated and therefore the heat will be distributed so as to effectively roast the beans.

If it is desirable to look at the coffee beans or other beans during the process of roasting this may be done by engaging the handles 3 on the cover 2 by the stove lid lifter or the like and bringing the said cover back until it rests upon the stove and then rotating the drum 6 to such a position that the door 8 will be on the uppermost side thereof. The said door may then be operated in the guides 9 and the beans within the drum thus exposed.

From the foregoing description it may be readily seen that I have provided a coffee roasting device by means of which coffee beans may be successively roasted and while being roasted may be observed by the operator. I have accomplished this by providing a drum revolubly mounted in a frame, which frame is supported on the coals of a range and by making a sliding door in the said drum and covering the drum and frame by a hinged cover.

I have further so constructed the device that the heat arising from the burning coals within the range will be directed over the drum so that all of the heat will be applied to the beans within the drum.

While I have illustrated and described a particular embodiment of my invention, I wish it to be understood that I do not wish to be limited to that particular embodiment for it is obvious that numerous changes may be made within the scope of the invention as defined by the claim.

What is claimed is:—

In combination with the fire box of a stove, a coffee roasting machine comprising a rectangular frame having its lower end extending into said fire box and resting upon the fuel therein, reinforcing wires extending around the upper edge of the frame and having oppositely disposed depressions therein, a shaft rotatably mounted in said depressions and having the ends thereof extending outwardly from the frame and engaging the upper surface of the stove so as to limit the movement of the frame into the fire box, said shaft having a crank handle on one end which extends beyond the adjacent side of the stove, a cover for said frame engaging said shaft to prevent displacement thereof when resting on said stove and a drum secured to the shaft and rotatable within the frame.

In testimony whereof I affix my signature, in the presence of two witnesses.

JOHN W. FISSE.

Witnesses:
L. J. STERLING,
JAS. F. ABELL.

Copies of this patent may be obtained for five cents each, by addressing the "Commissioner of Patents. Washington, D. C."